Oct. 25, 1960     W. SCHAEFER     2,957,440
AUTOMATIC ELECTRICALLY HEATED SOLDER POT

Filed April 15, 1957     2 Sheets-Sheet 1

Inventor
WILLIAM SCHAEFER
By Robertson and Yantis
Attorney

Oct. 25, 1960  W. SCHAEFER  2,957,440
AUTOMATIC ELECTRICALLY HEATED SOLDER POT
Filed April 15, 1957  2 Sheets-Sheet 2
FIG. 2
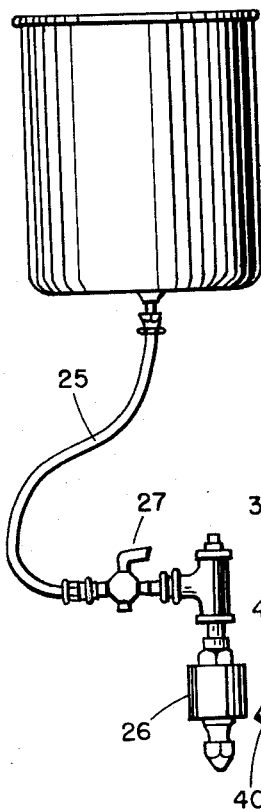
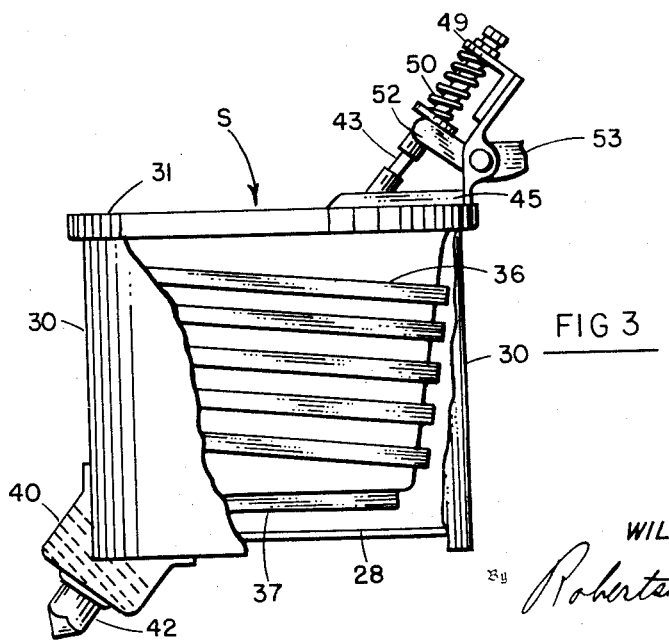
FIG 3
Inventor
WILLIAM SCHAEFER
By Robertson and Youtie
Attorney

United States Patent Office 2,957,440
Patented Oct. 25, 1960

2,957,440

AUTOMATIC ELECTRICALLY HEATED SOLDER POT

William Schaefer, Oaklyn, N.J., assignor to Oaklyn Specialty Company, Bellmawr, N.J.

Filed Apr. 15, 1957, Ser. No. 652,927

4 Claims. (Cl. 113—93)

The present invention relates to electrically heated solder pots and is concerned primarily with a particular type of such pot which is automatic in its operation.

At the present time, electrically heated solder pots are well-known and, as the name implies, consist generally of a pot for receiving the solder together with electric resistance heating elements for maintaining the pot at a required temperature and the solder in a liquid state. There is now available to the public a pot of this general type which is formed at the bottom with a discharge opening that is normally closed by a valve of the needle, or plunger, type. This valve is biased into closing position by a spring and may be opened against the influence of the spring to discharge one or more drops of liquid solder.

An important object of the present invention is to provide an electrically heated soldering pot of the character above-indicated which is defined by a flat bottom and a frusto-conical wall. The discharge opening is formed at an appropriate place in the corner between the bottom and conical wall. With the discharge opening so located, a discharge spout is arranged at an angle with respect to said bottom and communicates with said opening. Thus, the discharge spout assumes an inclined position projecting outwardly from one side of the pot which particularly adapts the pot to certain types of work. The end of the discharge spout is, of course, formed with a valve opening and cooperating therewith is a valve member of the needle type that is carried by a plunger which extends diagonally across the pot. Thus, it is entirely convenient and practical to mount the mechanism which spring biases the plunger on a side of the spot, leaving the top substantially open and free of impediments or obstacles.

An important object of the invention is to provide in an electrically heated solder pot of the character aforesaid, an inclined discharge spout of the type indicated which is provided with electric heating elements so that that solder which is received in the spout will not cool off, and be maintained at a proper temperature.

Electrically heated solder pots of the type with which this invention is concerned are ordinarily employed on assembly lines in which a large number of some standard type of article is successively treated by having a drop of solder applied thereto as the article passes a particular station.

With this condition in mind, another highly important object of the invention is to provide an electrically heated solder pot of the character indicated together with mechanism for automatically operating the valve plunger to open the valve as an article passes a station and thus deliver a drop of solder to the article.

More in detail, the invention has as an object the provision of an electrically heated solder pot of the type aforesaid in which the valve-carrying plunger is operated by a solenoid. The coil of this solenoid is included in an electric circuit that is under the control of some automatic type of electric instrumentality, such as a limit or contact switch or an electric eye. This switch or the light beam of the electric eye is appropriately located so that when one of the articles to be treated passes a particular station the circuit to the solenoid is energized to momentarily open the valve and thus deposit a drop of solder on the article.

Inasmuch as the use of solder requires a soldering flux, another object of the invention is to provide in combination with an electrically heated soldering pot of the character aforesaid, a reservoir for a soldering flux having a valve under the control of a second solenoid, and the latter solenoid is also energized at the same time as is the solenoid for the soldering pot proper so as to deliver a drop of the flux with the solder.

Various other more detailed objects and advantages of the invention such as arise in connection with carrying out the above-noted ideas in a practical embodiment will in part be apparent and in part be hereinafter stated as the description of the invention proceeds.

The invention therefore comprises an automatically electrically heated solder pot which includes a diagonally arranged discharge spout at one corner including a discharge valve together with a spring biased valve plunger operated by a solenoid which is under the control of an automatic electric instrumentality, together with a reservoir for a soldering flux and an electrically operated valve therefor under the control of the same automatic instrumentality.

For a full and more complete understanding of the invention reference may be had to the following description and accompanying drawings wherein:

Figure 2 is a view taken as a section through the solder pot and showing the reservoir for the flux and associated instrumentalities in section; and Figure 3 is an elevational view of the solder pot per se, with the outer casing broken away.

Figure 1:
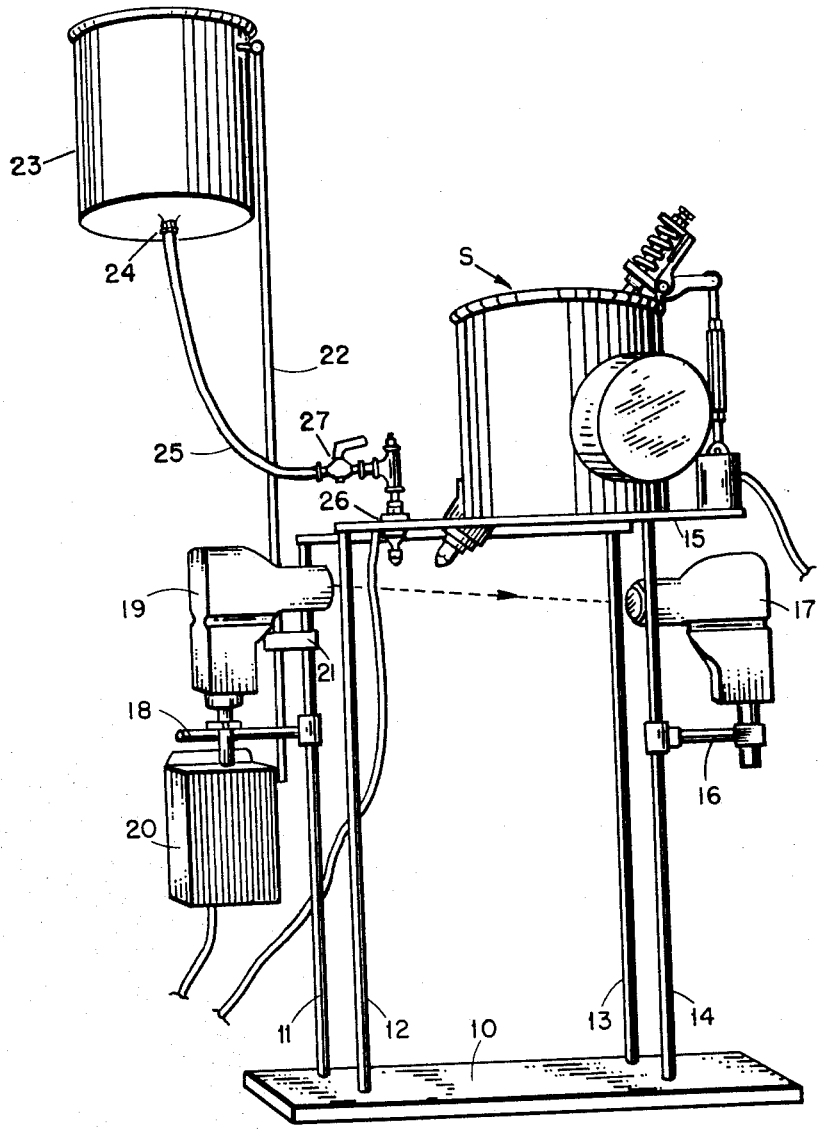
Figure 1 is a perspective view of a station in an assembly line including the electrically heated solder pot of this invention.

Referring now to the drawings and first more particularly to Figure 1, a station which may be included in an assembly line is therein depicted as including a base or pedestal 10. The latter will obviously rest on an appropriate supporting surface such as a floor, bench or table. Upstanding from this base 10 are four legs 11, 12, 13 and 14. These legs supoprt at the top a table designated 15 and supported from the table 15 is a solder pot which is referred to in its entirety by the reference character S.

Carried by the leg 14 is a bracket 16 which supports a photoelectric cell 17. The leg 11 carries another bracket 18 which supports a light source 19 and a transformer therefor, represented at 20. The light source 19 casts a light beam onto the photoelectric cell 17 as indicated by the broken line.

Supported from the leg 11 is another bracket 21 which carries an upright 22. Connected to the upper end of this upright 22 is a reservoir 23 for solder flux. This reservoir 23 is formed with a discharge opening 24 at the bottom, and depending therefrom is a line 25 going to an electrically operated discharge valve 26. The line 25 may also include a manually operable cut-off valve 27.

The discharge valve 26 is fixedly mounted in the table 15 and includes a solenoid that is energized when the light beam is broken. Thus, a drop or required amount of the solder flux is discharged from the valve 26 every time an article passes the station and thus breaks the light beam.

Referring now more particularly to Figures 2 and 3, the solder pot S is shown as comprising an outer bottom wall 28 having an outturned flange 29 and to which is secured an outer casing wall 30. The casing wall 30 is cylindrical and the bottom edge of this wall together with the bottom edge of the flange 29 rests upon the table 15. The pot proper is an integral structure comprising an annular or ring-like top flange 31 that rests on and is supported by the upper edge of the outer casing wall 30. Depending from this flange 31 is a truncated conical wall 32 that is integrally joined at the bottom to a flat bottom wall 33. Thus, there is an annular space 34 between the cylindrical wall 30 and the conical wall 32, and a flat space 35 between the bottom wall 33 and the outer bottom wall 28.

Appropriate electric resistance heating elements are shown at 36 as being located in the space 34 and surrounding the inner pot wall 32. Additional heating elements 37 are shown as underlying the pot bottom 33 and positioned in the space 35.

At an appropriate place in the corner defined by the joinder of the bottom wall 33 and conical wall 32 there is a flat or embossed portion 38 that is formed with a discharge opening. Communicating with this discharge opening is a discharge spout 39 that is supported by a cylindrical support 40 carried by the outer casing wall 30 and table 15. The discharge spout 39, of course, extends through appropriately formed openings in the walls 28 and 30.

As shown in Figure 2, additional electric resistance heating elements 41 are coiled about the discharge spout 39 and are effective to maintain this discharge spout and the solder therein at an appropriate temperature.

The discharge spout 39 includes a nozzle at 42 that is formed with a valve opening. This valve opening is normally closed by valve member formed at the end of a plunger 43. This plunger 43 extends through the spout 39 and diagonally across the inner pot 32 where it is received in a guide 44 carried by a bracket 45 which is anchored to the casing wall 30. The bracket 45 is formed with a vertically extending portion 46 from which upstands at an angle a bar 47. Secured to the latter is an L-shaped member 48 providing an end piece 49 against which bears one end of an expansion coil spring 50. This coil spring 50 encompasses the upper end of the plunger 43 and bears against an abutment member 51 that is fixedly secured to the plunger. Thus, the spring 50 normally urges the valve formed on the ends of the plunger into closed position in the nozzle 42. A bell crank including arms 52 and 53 is pivotally mounted at 54 on the upright 46 of the bracket 45. The arm 52 is bifurcated and bears against the abutment 51 on the plunger 43. Thus, when the bell crank is rotated in a clockwise direction (speaking with reference to the illustration of the drawings), the arm 52 retracts the plunger against the influence of the spring 50.

A solenoid is represented at 55 as being supported on the table 15. The armature of this solenoid is connected to one end of the bell crank arm 53 by the linkage 56 which includes mechanism at 57 for adjusting its effective length. It is evident that the solenoid 55 may be energized to rotate the bell crank and open the valve in the nozzle 42.

A thermostat for automatically maintaining the temperature of the pot S at a required degree is represented at 58. It will be understood that this thermostat 58, the coil of the solenoid 55 and the coil of the solenoid 26, as well as the light source 19, are all included in appropriate well-known electric circuits so that breaking of the light beam from the light source 19 to the photoelectric cell 17 will energize the two solenoid coils.

Operation

While the mode of operation of the automatic electrically heated solder pot of this invention is believed to be obvious from the illustration of the drawings and description of parts given, it may be briefly outlined as follows.

The adjustment 57 in the linkage may first be set to determine a proper operative stroke upon each energization of the solenoid 55 so that a required amount of solder will be discharged each time the solenoid is energized.

Moreover, the thermostat at 58 will be set to keep the pot at a required temperature.

While molten solder in the pot S and flux in the reservoir 23, when an article passes the station represented in Figure 1, the light beam is broken. This energizes the coils of both solenoids so that the discharge valve 26 is opened as is the valve in the nozzle 42. Thus, flux and solder is deposited on the article at the appropriate points as the article passes the station.

Immediately the light beam is restored to its unbroken condition, the solenoids are de-energized and both of the discharge valves are returned to their closed position. This operation is repeated as each article passes the station.

While the preferred specific embodiment of the invention is hereinbefore set forth, it is to be clearly understood that the invention is not to be limited to the exact designs, constructions and mechanisms illustrated and described because various modifications of these details may be provided in putting the invention into practice within the purview of the appended claims.

What is claimed is:

1. In an electrically heated solder pot, an inner pot having a circular wall and a bottom integrally joined thereto, there being a corner at the joinder of said wall and bottom, said corner being formed with a discharge opening, an outer casing including a cylindrical wall spaced from said circular wall and a bottom wall spaced from said bottom, electric resistance heating elements about said circular wall and within said cylindrical wall, additional electric resistance heating elements between said bottom and said bottom wall, an inclined discharge spout communicating with said discharge opening and spanning the space between said inner pot and casing, said discharge spout projecting beyond said casing and having a nozzle on its free end formed with a valve opening, a bracket mounted on the upper edge of said pot in a position diametrically opposite to said discharge opening, a guide on said bracket, an inclined plunger received in said guide and having one end formed as a valve member co-operating with said valve opening, a spring biasing said plunger to valve closing position, and a bell crank pivotally mounted on said bracket and having a short arm extending toward and operatively connected to said plunger and having a long arm extending outward beyond said outer casing for actuation to move the plunger against the influence of said spring to valve opening position.

2. In combination, elevated support means for location over a conveyor, flux-discharge means carried by said support means and opening generally downward for discharge to conveyed articles, electrically operable valve means in said flux-discharge means for controlling the discharge of flux, a heated solder pot carried by said support means alongside said flux-discharge means, a discharge spout depending obliquely from the lower region of said pot on the side adjacent to said flux-discharge means and extending on a line intersecting with the line of discharge of said flux-discharge means, a bracket mounted on the upper region of said pot on the side remote from said flux-discharge means, a plunger having one end slidable in said spout for opening and closing the latter and extending upward therefrom obliquely across the interior of said pot having its other end slidably engageable with said bracket, resilient means on said bracket urging said plunger toward its spout-closing position, a bell crank pivotally mounted on said bracket having a short arm operatively connected to said plunger for sliding the latter to its spout-opening position against the force of said resilient means and having a long arm extending outward beyond said pot on the remote side thereof, electric actuating means connected to said long crank arm for actuating the latter, and sensing means located beneath said support means for sensing the presence of articles being conveyed and electrically connected to said valve and actuating means for effecting the discharge of flux and solder to an article being conveyed.

3. The combination according to claim 2, said bracket including a fixed end wall disposed above said pot normal to and slidably receiving the upper region of said plunger, an abutment fixed to said plunger spaced below said end wall, said resilient means comprising a coil compression spring circumposed about said plunger interposed between and having its opposite ends in bearing engagement with said end wall and abutment, for urging said plunger toward its spout-closing position.

4. The combination according to claim 3, said bell crank being mounted for pivotal movement about a generally horizontal axis normal to the vertical plane of said plunger and having its short arm in bearing engagement with the underside of said abutment.

References Cited in the file of this patent

UNITED STATES PATENTS

| | | |
|---|---|---|
| 480,034 | Quentell | Aug. 2, 1892 |
| 651,381 | Peters | June 12, 1900 |
| 989,818 | Smith | Apr. 18, 1911 |
| 1,147,416 | MacDonald | July 20, 1915 |
| 1,527,714 | Tarrant | Feb. 24, 1925 |
| 1,652,409 | Moulthrop | Dec. 13, 1927 |
| 1,860,048 | Myers | May 24, 1932 |
| 2,094,795 | Johnson | Oct. 5, 1937 |
| 2,271,188 | Franz | Jan. 27, 1942 |
| 2,564,427 | De Rugeris | Aug. 14, 1951 |
| 2,672,837 | Maher | Mar. 23, 1954 |
| 2,674,397 | Plusquellic | Apr. 6, 1954 |
| 2,780,712 | Thomas | Feb. 5, 1957 |